(12) United States Patent
Kim

(10) Patent No.: US 10,591,814 B2
(45) Date of Patent: Mar. 17, 2020

(54) SYNTHETIC IMAGE DISPLAYING DEVICE

(71) Applicant: TOVIS CO., LTD., Incheon (KR)

(72) Inventor: Yong Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/300,585

(22) PCT Filed: May 11, 2017

(86) PCT No.: PCT/KR2017/004863
§ 371 (c)(1),
(2) Date: Nov. 12, 2018

(87) PCT Pub. No.: WO2017/196089
PCT Pub. Date: Nov. 16, 2017

(65) Prior Publication Data
US 2019/0331998 A1    Oct. 31, 2019

(30) Foreign Application Priority Data
May 12, 2016    (KR) .......................... 10-2016-0058161

(51) Int. Cl.
*G03B 21/26*    (2006.01)
*G03B 21/14*    (2006.01)
(Continued)

(52) U.S. Cl.
CPC .......... *G03B 21/26* (2013.01); *G03B 21/147* (2013.01); *G03B 21/60* (2013.01); *G03B 21/62* (2013.01);
(Continued)

(58) Field of Classification Search
CPC ........ G03B 21/26; G03B 21/60; G03B 21/62; G03B 21/147; G03B 21/625; G02B 27/46; G02B 27/0101; G02B 27/0103
See application file for complete search history.

(56) References Cited

U.S. PATENT DOCUMENTS

2005/0110964 A1* 5/2005 Bell ........................ G06F 3/011
 353/122
2006/0268404 A1* 11/2006 Hyobu ................... G03B 21/10
 359/456

(Continued)

FOREIGN PATENT DOCUMENTS

JP    2015-232593 A    12/2015
KR    10-2000-0054598 A    9/2000
(Continued)

OTHER PUBLICATIONS

International Search Report for PCT/KR2017/004863 dated Jul. 24, 2017 from Korean Intellectual Property Office.

*Primary Examiner* — Sultan Chowdhury
(74) *Attorney, Agent, or Firm* — Revolution IP, PLLC

(57) ABSTRACT

A synthetic image display device includes: a beam projector configured to project a first image; a screen on which the first image projected from the beam projector is formed; and a transparent display panel disposed so as to face the screen and configured to display a second image to be combined and viewed with the first image formed on the screen, the transparent display panel being formed with a pinhole for penetration of light in each pixel so that the first image penetrates and is viewed through the transparent display panel.

7 Claims, 7 Drawing Sheets

(51) Int. Cl.
*G03B 21/60* (2014.01)
*G03B 21/62* (2014.01)
*G09F 19/18* (2006.01)
*A63F 13/25* (2014.01)

(52) U.S. Cl.
CPC .............. *G09F 19/18* (2013.01); *A63F 13/25* (2014.09); *A63F 2300/30* (2013.01)

(56) References Cited

U.S. PATENT DOCUMENTS

| | | | |
|---|---|---|---|
| 2009/0009861 A1 | 1/2009 | Hyobu | |
| 2009/0109404 A1* | 4/2009 | Thornton | G02B 27/2292 |
| | | | 353/10 |
| 2013/0082986 A1* | 4/2013 | Yamauchi | G02F 1/1334 |
| | | | 345/204 |
| 2013/0182302 A1* | 7/2013 | Shikii | B60K 35/00 |
| | | | 359/13 |
| 2013/0222771 A1* | 8/2013 | Tsubota | G02B 26/101 |
| | | | 353/20 |

FOREIGN PATENT DOCUMENTS

| KR | 10-2006-0069233 A | 6/2006 |
|---|---|---|
| KR | 10-2008-0012587 A | 2/2008 |
| KR | 10-2008-0105026 A | 12/2008 |
| KR | 10-2013-0083312 A | 7/2013 |

* cited by examiner

[FIG.7]
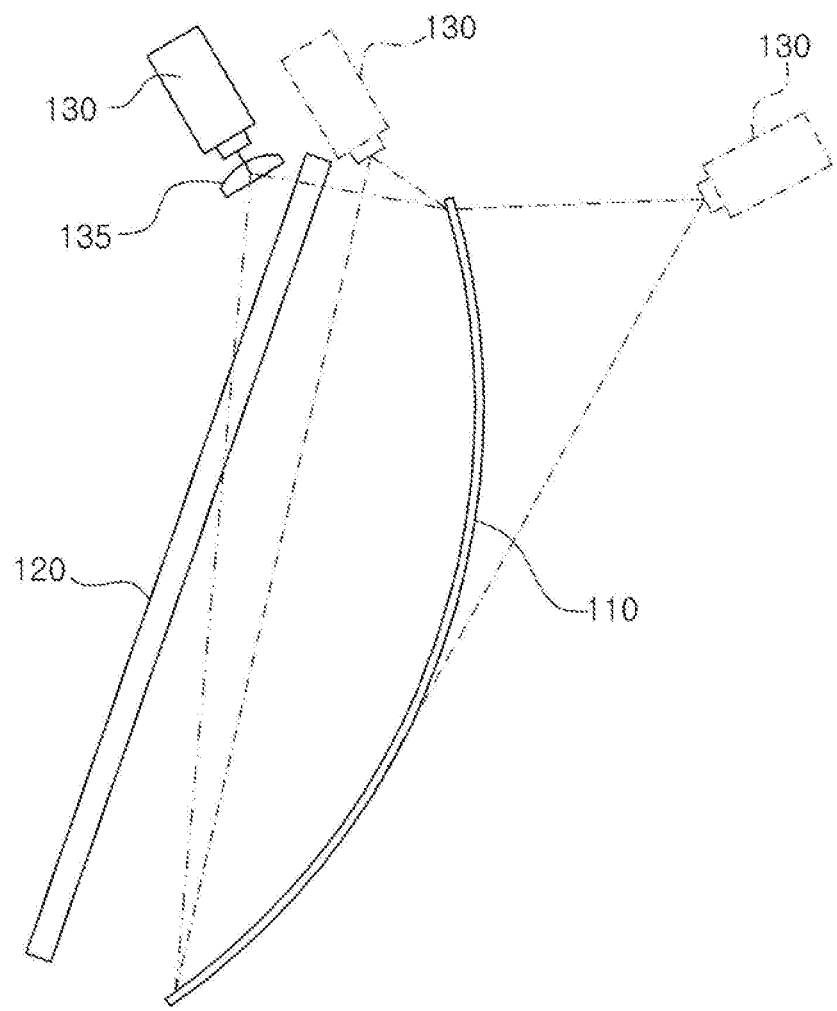

SYNTHETIC IMAGE DISPLAYING DEVICE

TECHNICAL FIELD

The present invention relates to an image display device that displays two or more different images.

BACKGROUND ART

In general, a game machine executes a game via a game screen. Recently, as an attempt to display a game screen in three dimensions in order to increase interest in a game, "THREE-DIMENSIONAL VIDEO PROJECTOR" was disclosed in Korean Patent Laid-Open Publication No. 10-2000-0054598.

The above conventional three-dimensional video projector includes: a wall-mounted video computer connected to at least one video provision device of a video cassette recorder (VCR) that plays back a video and an Internet device that provides DVD data and various videos in real time, the computer providing a video image from the video provision device to a luminescent display screen; a spatial-object-image display device including the luminescent display screen configured to output an inverted first image of the video image provided from the wall-mounted video computer for providing a first spatial object, a lens fixed to a partition of a housing so as to be spaced apart from the luminescent display screen by a predetermined distance so that the first image is projected through the lens and appears as the first spatial object, the housing surrounding the luminescent display screen and the lens to allow light to penetrate only the lens and a translucent cover screen, and the translucent cover screen spaced apart from the lens by a predetermined distance to partially penetrate the video image of the luminescent display screen, a video of a projector being projected as a second image onto the translucent cover screen; and the projector provided to project the second image over the translucent cover screen.

The conventional three-dimensional video projector having the above-described configuration may provide a three-dimensional image by generating a virtual image from an image provided by the video provision device using the lens and projecting an image from the projector onto the screen so that a viewer views a synthetic image of the virtual image and the projector image.

However, due to the fact that the conventional three-dimensional video projector generates the virtual image from the first image on the display screen using the lens, it is substantially difficult to form an image in the space, and the size of the virtual image may vary depending on the distance from the viewer. In addition, since both the first image and the second image are formed on the screen, the first image is viewed in an inverted state, which makes the conventional three-dimensional video projector somewhat inadequate for providing 3D images.

In addition, in order to form the projector image on the screen, since it is necessary to install the projector so as to project the second image toward the screen in the direction in which the viewer is located, determining the installation position of the projector may be difficult.

Meanwhile, as a method of generating a complex image or realizing three-dimensional effects using two displays, there is technology of realizing three-dimensional effects by providing two liquid crystal displays (LCDs) at a predetermined interval so that a viewer views two overlapping LCD screens in different planes (at different distances). In this case, however, in consideration of the fact that the transmittance of an LCD is below 10%, the rear LCD of the overlapping LCDs requires a backlight unit (BLU) that is 10 times or more brighter than the original LCD brightness in order to achieve sufficient brightness for viewing, the aging of the BLU may rapidly progress due to excessive power consumption and heat generation.

DISCLOSURE

Technical Problem

The present invention has been made in view of the above problems, and it is one object of the present invention to provide a synthetic image display device, which is capable of improving the three-dimensional effects of a synthetic image, enables the installation position of a beam projector to be easily and freely changed, and is capable of providing a viewer with a vivid synthetic image obtained by combining two images, neither of which includes a virtual image.

In addition, it is another object of the present invention to provide a synthetic image display device, which is capable of preventing the aging of a backlight unit (BLU) due to excessive power consumption and heat generation required to provide bright light.

Technical Solution

In accordance with an aspect of the present invention, the above and other objects can be accomplished by the provision of a synthetic image display device including a beam projector configured to project a first image, a screen on which the first image projected from the beam projector is formed, and a transparent display panel disposed so as to face the screen and configured to display a second image to be combined and viewed with the first image formed on the screen, the transparent display panel being formed with a pinhole for penetration of light in each pixel so that the first image penetrates and is viewed through the transparent display panel.

One of the screen and the transparent display panel may be formed in a curved shape in order to increase a spatial sense by a change in distance between the screen and the transparent display panel.

The screen may be configured with a translucent body so that a viewer views the second image displayed on the transparent display panel through the screen together with the first image when the screen is located closer to the eyes of the viewer than the transparent display panel.

The screen may be a switching panel, a transmittance of which is electrically changeable.

The transparent display panel may be inwardly concavely curved at a center thereof when viewed by a viewer, and the screen may be located closer to the viewer than the transparent display panel and may be formed in a planar shape to interconnect both ends of the display panel, which is bent in a curved shape.

The screen may have a curved shape, and the beam projector may include a curvature correction lens configured to deform the first image so as to be curved in a direction opposite a direction in which the screen is curved before projecting the first image in order to prevent the first image from being distorted by the curved shape of the screen.

The transparent display panel may include a transmissive diffusion sheet formed with a diffusion pattern in a portion thereof corresponding to the pinhole so that light passing through the pinhole is diffused to and penetrates a portion in which the pinhole is not formed.

The screen may be smaller than the transparent display panel so that a synthetic image is viewed only on a portion of the transparent display panel.

Advantageous Effects

According to the present invention, since a viewer views a synthetic image of a first image formed on a screen and a second image displayed on a transparent display panel formed with pinholes, it is possible to provide a synthetic image having improved three-dimensional effects. Moreover, the viewer can view a vivid synthetic image since the synthetic image is made by overlapping actually formed images, neither of which includes a virtual image.

In addition, since the first image of a beam projector penetrates the transparent display panel and is formed on the screen, it is possible to easily and freely set and change the installation position of the beam projector.

In addition, it is possible to minimize power consumption required in order to light the transparent display panel, and to prevent aging due to heat generation.

DESCRIPTION OF DRAWINGS

FIG. 7 is a schematic side view of an image display device that displays a synthetic image according to a second embodiment of the present invention.

BEST MODE

Hereinafter, embodiments of the present invention will be described with reference to the accompanying drawings.

First, a synthetic image display device 110 according to the present invention may be used as an image output device such as, for example, a game machine or a digital public signage product, and may be applied to various other fields that require an image output device.

Figure 1:
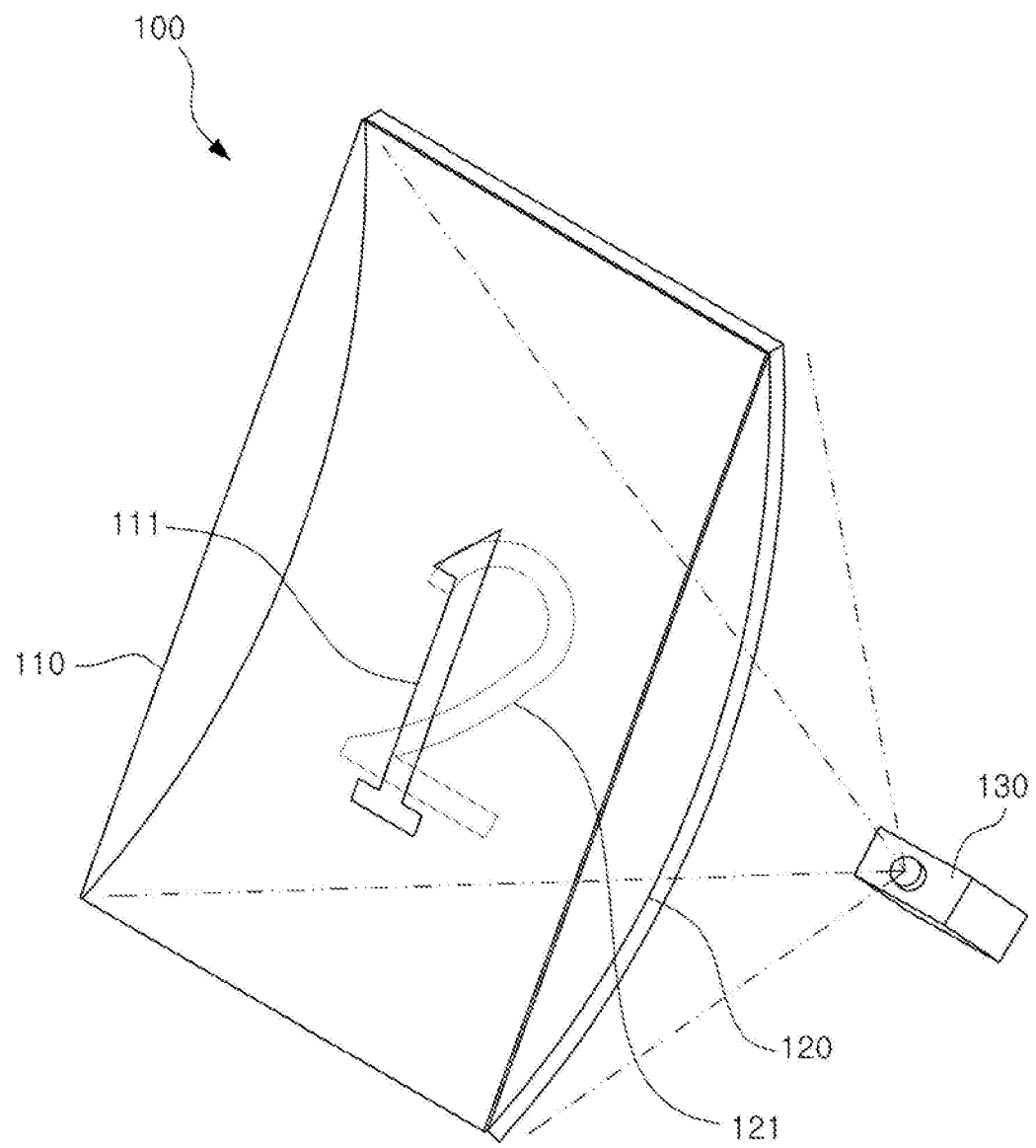
FIG. 1 is a schematic perspective view of an image display device that displays a synthetic image according to a first embodiment of the present invention.
Figure 2:
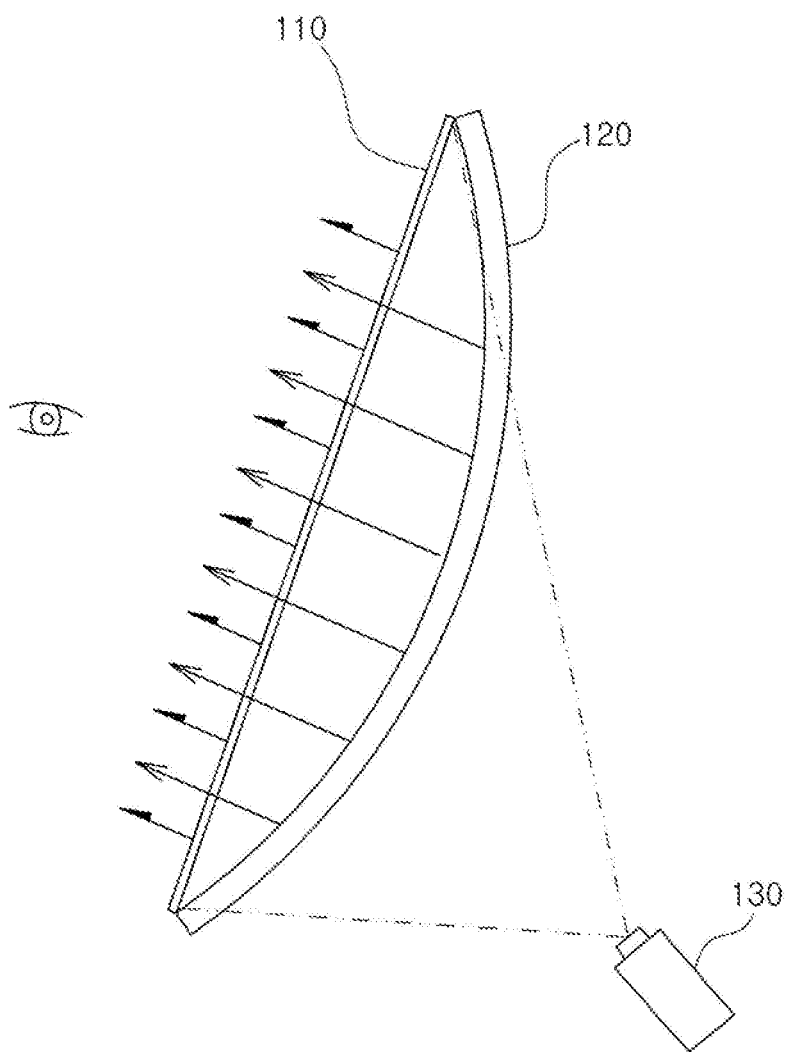
FIG. 2 is a schematic side view of the image display device that displays a synthetic image according to the first embodiment of the present invention.

As illustrated in FIGS. 1 and 2, the synthetic image display device 100 according to a first embodiment of the present invention may include a beam projector 130.

The beam projector 130 may project a first image 111.

The beam projector 130 may be a known beam projector 130 such as a DLP, LCD, LCOS, CRT, or laser projector. The beam projector 130 may receive a source provided from a game machine, a computer, or an optical medium playback device such as a DVD player or a Blue-ray disc player and output the first image 111.

Then, the first image 111 projected from the beam projector 130 may be formed on a screen 110 so that a viewer can view the first image 111.

As illustrated in FIGS. 1 and 2, the synthetic image display device 100 according to the first embodiment of the present invention may include the screen 110.

The screen 110 is used for the formation of the first image 111 projected from the beam projector 130, and the viewer can view the first image 111 on the screen.

The screen 110 may be subjected to surface treatment in order to improve the visibility of the first image 111 projected from the beam projector 130. Here, the surface treatment may be performed by coating using a mixture of micro-beads and a binder, or by applying a non-reflective paint or a reflective paint.

Additionally, the screen 110 may be configured with a translucent body so that the viewer can view an image or an object located behind the screen 110 at the same time of formation of the first image 111 according to the positions of the beam projector 130 and a transparent display panel 120, which will be described below.

Figure 3:
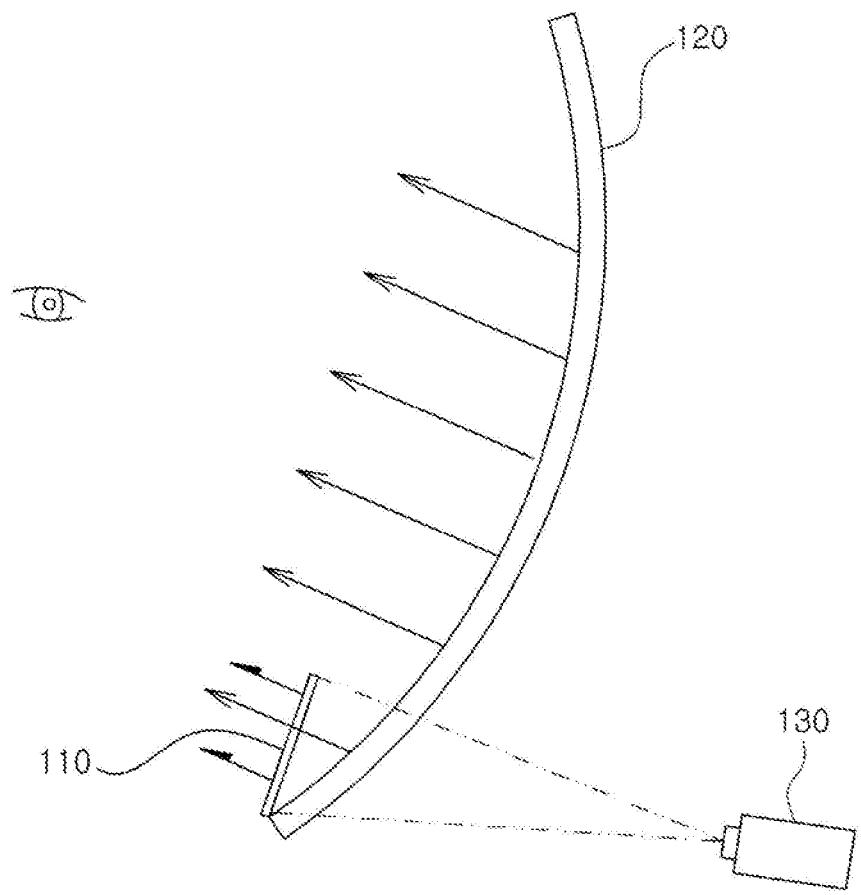
FIG. 3 is a schematic side view of the image display device that displays a synthetic image according to the first embodiment of the present invention, illustrating the state in which a screen is provided only on a portion of a transparent display panel.

In addition, as illustrated in FIG. 3, the screen 110 may be smaller than the transparent display panel 120 so that a synthetic image may be viewed only on a portion of the transparent display panel 120.

In addition, the screen 110 may be convexly or concavely curved in the direction in which the eyes of the viewer are directed.

When the screen 110 is located at the front of the transparent display panel 120, the screen 110 may be configured with a translucent body to allow the viewer to view a second image on the transparent display panel 120, which is located behind the screen 110, through the screen 110.

Here, the screen 110 may be realized as a switching panel that is selectively switched between a transparent state and an opaque state, or is controllably changeable in transmittance. The switching panel may be, for example, a PDLC, a PSCT, or any one of various other known types of switching panels that is electrically changed between a transparent state and an opaque state.

As illustrated in FIGS. 1 to 4, the synthetic image display device 100 according to the first embodiment of the present invention may include the transparent display panel 120.

The transparent display panel 120 is transparent so as to penetrate the first image 111 projected from the beam projector 130 or to allow the first image 111 formed on the screen 110 to be viewed therethrough. The transparent display panel may autonomously display a second image 121 thereon.

Here, the first image 111 and the second image 121 may be different images. Alternatively, one of the two images may be a background image and the other image may be a main image. When the first image 111 and the second image 121 are displayed by a known three-dimensional method, it may be possible for the viewer to view a three-dimensional image without wearing three-dimensional glasses.

Meanwhile, to obtain increased transparency, the transparent display panel 120 may be formed with a pinhole 127, through which light passes to allow the viewer to view the first image 111, in a remaining portion of each pixel excluding a portion of the pixel in which an image is displayed.

Here, the transparent display panel 120 may be realized as a transparent OLED (TOLED) panel. Since the pinhole 127, as a transmissive window for light penetration, is formed in a remaining portion of each pixel excluding an image display portion 125 (e.g. a TFT element) of the pixel defined between lattice-shaped signal lines 123, the TOLED panel may allow the viewer to view the first image 111 formed on the screen 110 through the pinhole 127, or may cause the first image 111 projected from the beam projector 130 to pass through the pinhole 127 and be formed on the screen 110.

Here, the pixel may include all of R, G, and B pixels, or may correspond to any one of R, G, and B pixels.

Additionally, although attempts to utilize an LCD as a transparent display panel 120 in a similar manner have been made in the past, the transmittance of an LCD is too low to utilize the LCD as the transparent display panel 120 (since the transmittance of an LCD is generally 10% or less, and the transmittance of an LCD that is particularly manufactured for a transparent display is at most 20%).

In addition, in the state in which the screen 110 is provided at the front of an LCD, when attempting to form an image on the screen by passing light through the LCD from the beam projector 130 located behind the LCD, since pixels constituting a screen of the LCD include R, G, and B color filters, the color filters may absorb the light (which is also composed of R, G and B light components) projected from the beam projector 130. Therefore, it is impossible for the light from the beam projector to pass through the LCD and form an image on the screen 110 provided at the front of the LCD.

On the other hand, when the transparent display panel 120 is realized as a TOLED panel according to the present invention, pixels constituting a screen are configured with an OLED matrix having an RGB self-luminous function, rather than the color filters, unlike the LCD, and the transparency of the panel is achieved by the pinhole 127 formed in the panel. Therefore, the transparent display panel may achieve considerably higher transparency (30~40% or more) compared to the LCD, and may cause no light absorption by color filters as in the LCD when attempting to form an image on the screen 110 by passing light from the beam projector 130 through the TOLED, which enables the provision of a vivid image.

Meanwhile, when the transparent display panel 120 is realized as an LCD, it is conceivable that color filters are processed so as to be opaque and a pinhole for light penetration is formed in a portion of each pixel corresponding thereto.

In addition, the transparent display panel 120 may include a transmissive diffusion sheet (not illustrated).

The transmissive diffusion sheet may diffuse light passing through the pinhole 127.

That is, in each pixel of the transparent display panel 120, since a portion thereof in which the pinhole 127 is formed penetrates light, but takes the form of a point light source that substantially displays an image, the portion of the pixel in which the pinhole 127 is formed and a remaining portion of the pixel in which the pinhole 127 is not formed and no light can penetrate may be distinguishable from each other due to a boundary therebetween.

In order to prevent this, the transmissive diffusion sheet is formed with a diffusion pattern that diffuses light on a portion thereof corresponding to the pinhole 127 so as to diffuse the light from the portion in which the pinhole 127 is formed. Therefore, the light is diffused by the diffusion pattern when passing through the pinhole 127, which obscures the boundary between the portion of the pixel in which the pinhole 127 is formed and a remaining portion of the pixel in which the pinhole 127 is not formed, whereby the first image 111, which passes through the pinhole 127 or is viewed through the pinhole 127, may become vivid.

The operational relationship and effects of the respective components described above will be described.

In the synthetic image display device 100 according to the first embodiment of the present invention, the screen 110 is provided in front of the eyes of the viewer, the transparent display panel 120 is provided behind the screen 110, and the beam projector 130 is configured to project the first image 111 from a position out of the sight of the viewer so as to penetrate the transparent display panel 120 and be formed on the screen 110.

Here, the screen 110 is configured with a translucent body to allow the second image 121, displayed on the transparent display panel 120 behind the same, to be combined and viewed with the first image.

Then, in the first embodiment, the transparent display panel 120 is inwardly concavely curved when viewed by the eyes of the viewer and the screen 110 is formed in a planar shape to interconnect two ends of the curved transparent display panel 120, but both the transparent display panel 120 and the screen 110 may be formed in a curved shape or in a planar shape, or the screen 110 may be formed in a curved shape and the transparent display panel 120 may be formed in a planar shape.

Figure 4:
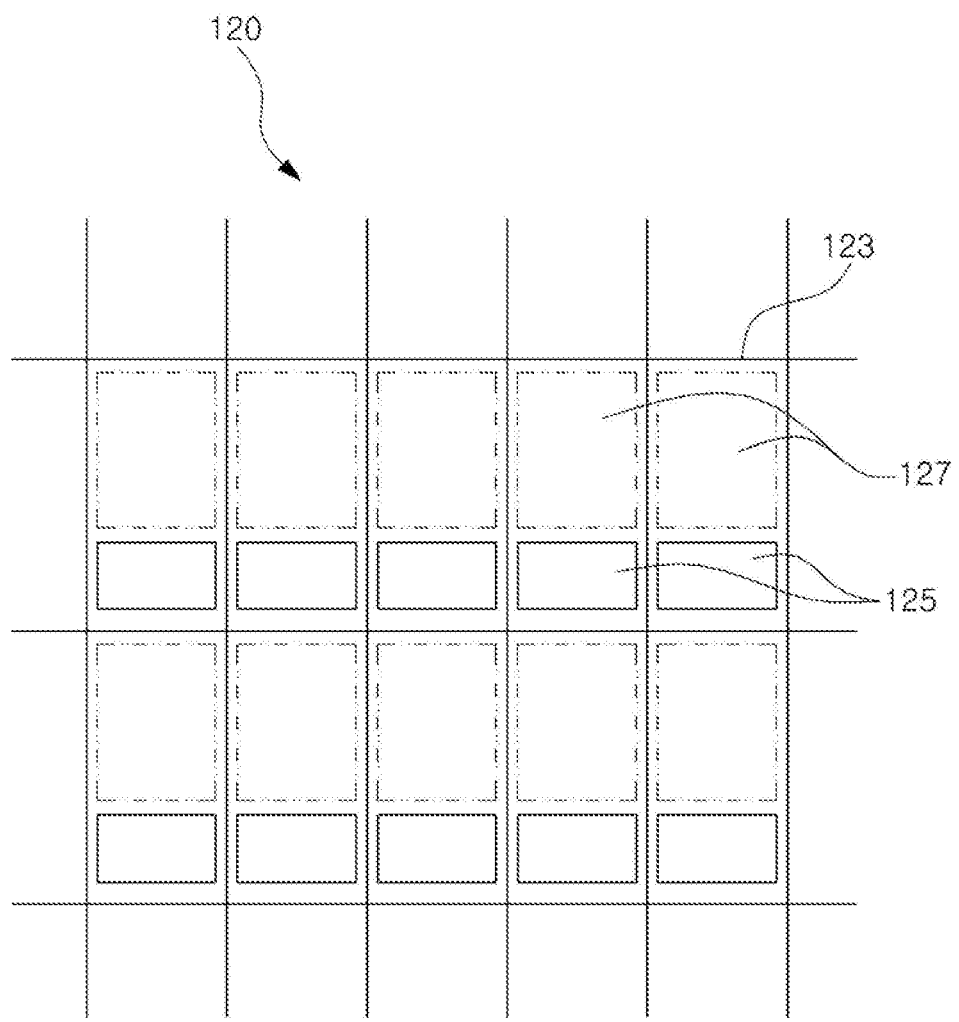
FIG. 4 is a front view schematically illustrating an image viewed by the image display device that displays a synthetic image according to the first embodiment of the present invention.
Figure 5:
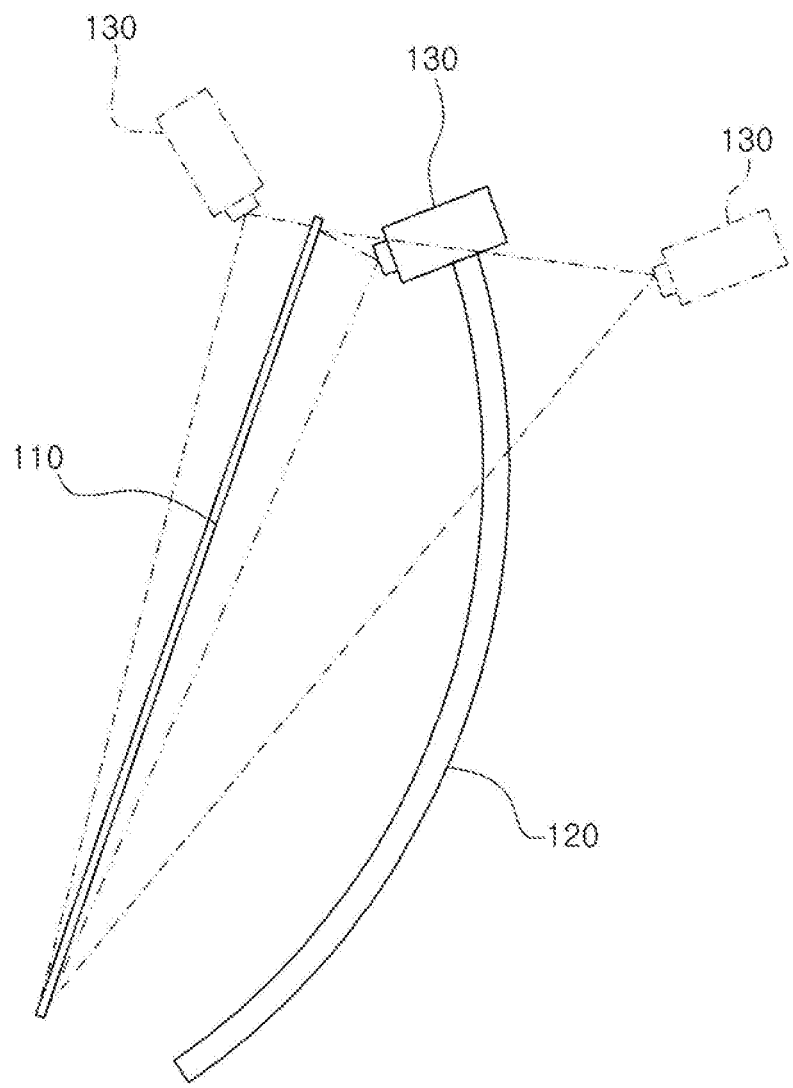
FIG. 5 is a front view schematically illustrating a transparent display panel constituting the image display device that displays a synthetic image according to the first embodiment of the present invention.

In addition, in the first embodiment, the beam projector 130 is configured to project the first image 111 onto the screen 110 through the transparent display panel 120, but, as illustrated in FIG. 4, the beam projector 130 may be configured to directly project the first image 111 onto the screen 110 at a position at the front of or at the back of the screen 110 without interposing the transparent display panel 120 therebetween. The beam projector 130 may be located above or under the transparent display panel 120 so as to be hidden from the eyes of the viewer.

Figure 6:
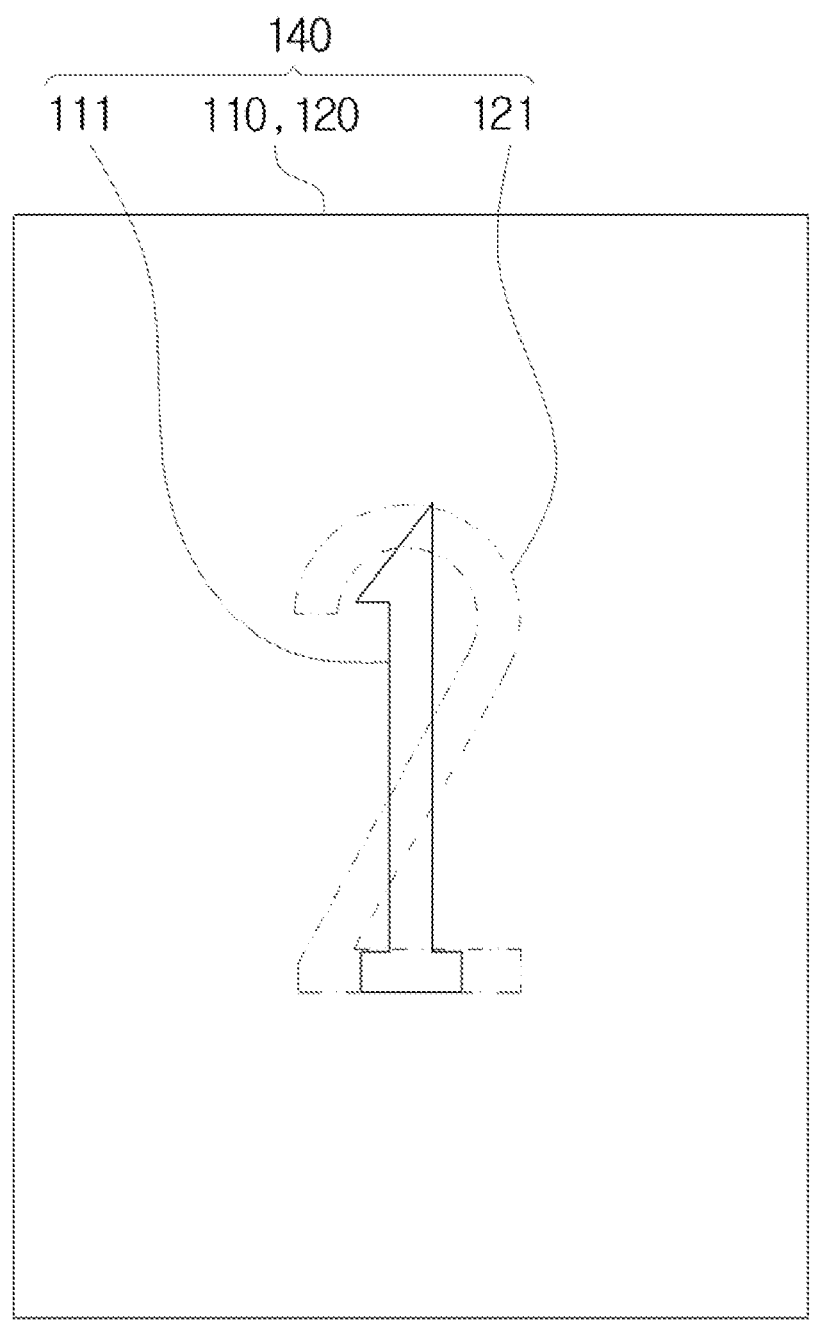
FIG. 6 is a schematic side view of the image display device that displays a synthetic image according to the first embodiment of the present invention, schematically illustrating the installation position of a beam projector.

With the synthetic image display device 100 according to the first embodiment of the present invention having the above-described configuration, as illustrated in FIG. 6, when the beam projector 130 projects the first image 111, the first image 111 passes through the pinhole 127 in the transparent display panel 120 and is formed on the screen 110, and at the same time, the second image 121 is displayed on the transparent display panel 120. Thereby, the viewer can view a synthetic image 140 that provides a visual spatial sense via combination of the first image 111, formed on the screen 110, and the second image 121, displayed on the transparent display panel 120.

Here, when one of the transparent display panel 120 and the screen 110 is bent in a curved shape, the three-dimensional effects of a synthetic image may be further improved according to a change in distance between the first image 111 and the second image 121 in a direction from the periphery to the center.

In addition, since the first image 111 projected from the beam projector 130 may provide a fresh sense, whereas the second image 121 displayed on the transparent display panel 120 may be vivid, combination of the two images providing different senses may improve the three-dimensional effects of a synthetic image and may provide the viewer with a vivid image.

Hereinafter, a synthetic image display device according to a second embodiment of the present invention will be described.

As illustrated in FIG. 7, in the synthetic image display device 100 according to the second embodiment, the transparent display panel 120 is disposed in front of the eyes of the viewer, and the screen 110 is disposed at the back of the transparent display panel 120. The screen 110 is bent in a curved shape.

When the screen 110 is formed in a curved shape, the beam projector 130 may be provided with an image correction lens 135, which corrects the first image 111 to be projected so that the first image 111 is curved in a direction opposite the direction in which the screen 110 is bent in a curved shape.

Here, since distortion of an image occurs according to a change in distance due to the characteristics of the beam projector 130 when the screen 110 is formed in a curved shape, by deforming the first image 111 so as to be curved in a direction opposite the direction in which the screen 110 is bent in a curved shape, the image correction lens 135 may correct the first image 111 so that the first image 111 is viewed as a normal image, despite the curved shape of the screen 110, when formed on the screen 110.

It is to be noted that, although only the screen 110 is illustrated as in the bent state in the second embodiment, the transparent display panel 120 may be bent in the same curved shape as the screen 110.

In addition, in the second embodiment, although the beam projector 130 is illustrated as being configured to project the second image 121 onto the screen 110 through the transparent display panel 120, the beam projector 130 may be located between the transparent display panel 120 and the screen 110 to project the first image 111 so that the first image 111 is formed on the front of the screen 110 without penetrating the transparent display panel 120.

In addition, the beam projector 130 may be disposed behind the screen 110 so that the first image 111 projected from the beam projector 130 is formed on the back of the screen 110. Here, the screen 110 may be configured with a translucent body to allow the image formed on the back of the screen 110 to be visible from the front side.

With the image display device 100 for a game, which displays the synthetic image 140 according to the second embodiment of the present invention having the above-described configuration, the first image 111 projected from the beam projector 130 is formed on the screen 110 and the transparent display panel 120 displays the second image 121, whereby the viewer can view the synthetic image 140 obtained via combination of the first image 111 and the second image 121.

Accordingly, the synthetic image display device 100 according to the embodiments of the present invention may allow the viewer to view a three-dimensional image by combining the first image 111 projected from the beam projector 130 with the second image 121 displayed on the transparent display panel 120, and may freely set the installation position of the beam projector 130 by causing the image projected from the beam projector 130 to penetrate the transparent display panel 120 and be formed on the screen 110.

In addition, since the viewer can view a synthetic image obtained by combining the image from the beam projector 130 with the image on the transparent display panel 120, the image display device 100 may achieve further improved three-dimensional effects of the synthetic image and may provide the viewer with a convincing image in which a digital image and an analogue image are synthesized.

In addition, since it is not necessary to excessively increase the amount of light in the transparent display panel 120 in order to view the synthetic image 140, it is possible to reduce power consumption and to prevent aging due to deterioration.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims

DESCRIPTION OF REFERENCE NUMERALS

100: synthetic image display device 110: screen
111: first image 120: transparent display panel
121: second image 123: signal line
125: image display portion 127: pinhole
130: beam projector 135: image correction lens
140: synthetic image

INDUSTRIAL APPLICABILITY

The present invention is applicable to industrial fields using a display such as, for example, game, video, and advertisement industries.

The invention claimed is:

1. A synthetic image display device comprising:
a beam projector configured to project a first image;
a screen on which the first image projected from the beam projector is formed; and
a transparent display panel disposed so as to face the screen and configured to display a second image to be combined and viewed with the first image formed on the screen, the transparent display panel being formed with a pinhole for penetration of light in each pixel so that the first image penetrates and is viewed through the transparent display panel,
wherein the transparent display panel is inwardly concavely curved at a center thereof when viewed by a viewer, and the screen is located closer to the viewer than the transparent display panel.

2. The synthetic image display device according to claim 1, wherein one of the screen and the transparent display panel is formed in a curved shape in order to increase a spatial sense by a change in distance between the screen and the transparent display panel.

3. The synthetic image display device according to claim 1, wherein the screen is configured with a translucent body so that a viewer views the second image displayed on the transparent display panel through the screen together with the first image when the screen is located closer to the eyes of the viewer than the transparent display panel.

4. The synthetic image display device according to claim 1, wherein the screen is a switching panel, a transmittance of which is electrically changeable.

5. The synthetic image display device according to claim 1, wherein the screen has a curved shape, and
wherein the beam projector comprises a curvature correction lens configured to deform the first image so as to be curved in a direction opposite a direction in which the screen is curved before projecting the first image in order to prevent the first image from being distorted by the curved shape of the screen.

6. The synthetic image display device according to claim 1, wherein the transparent display panel comprises a transmissive diffusion sheet formed with a diffusion pattern in a portion thereof corresponding to the pinhole so that light passing through the pinhole is diffused to and penetrates a portion in which the pinhole is not formed.

7. The synthetic image display device according to claim 1, wherein the screen is smaller than the transparent display panel so that a synthetic image is viewed only on a portion of the transparent display panel,
wherein the synthetic image is defined by a combination of the first image formed on the screen and the second image displayed on the transparent display panel.

* * * * *